(12) United States Patent
Chae

(10) Patent No.: US 9,632,287 B2
(45) Date of Patent: Apr. 25, 2017

(54) LENS MODULE

(71) Applicant: SAMSUNG ELECTRO-MECHANICS CO., LTD., Suwon-Si (KR)

(72) Inventor: Kyu Min Chae, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/328,681

(22) Filed: Jul. 10, 2014

(65) Prior Publication Data

US 2015/0277083 A1    Oct. 1, 2015

(30) Foreign Application Priority Data

Mar. 28, 2014  (KR) .................... 10-2014-0036968

(51) Int. Cl.
  *G02B 13/00*  (2006.01)
  *G02B 9/64*  (2006.01)
  *G02B 27/00*  (2006.01)

(52) U.S. Cl.
  CPC .......... *G02B 13/0045* (2013.01); *G02B 9/64* (2013.01); *G02B 27/0025* (2013.01)

(58) Field of Classification Search
  CPC ........ G02B 3/04; G02B 9/64; G02B 13/0045; G02B 13/02; G02B 13/18
  USPC ................................................ 359/708, 755
  See application file for complete search history.

(56) References Cited

U.S. PATENT DOCUMENTS

| 3,975,091 | A | 8/1976 | Takahashi |
| 5,796,529 | A | 8/1998 | Park |
| 8,599,495 | B1 | 12/2013 | Tsai et al. |
| 9,128,270 | B2 | 9/2015 | Nishihata et al. |
| 2012/0026606 | A1 | 2/2012 | Lee |
| 2012/0162787 | A1* | 6/2012 | Adachi ................. G02B 13/00 359/785 |
| 2012/0257100 | A1 | 10/2012 | Imaoka et al. |
| 2014/0160580 | A1* | 6/2014 | Nishihata ........... G02B 13/0045 359/708 |

(Continued)

FOREIGN PATENT DOCUMENTS

| CN | 1152717 A | 6/1997 |
| CN | 103149667 A | 6/2013 |

(Continued)

OTHER PUBLICATIONS

Translation of Matsuzaka et al. JP02006163075 publication.*

(Continued)

*Primary Examiner* — Scott J Sugarman
*Assistant Examiner* — Gary O'Neill
(74) *Attorney, Agent, or Firm* — NSIP Law

(57) ABSTRACT

A lens module may include a first lens having positive refractive power; a second lens having positive refractive power; a third lens having negative refractive power; a fourth lens having refractive power; a fifth lens having refractive power; a sixth lens having negative refractive power; and a seventh lens having refractive power and one or more inflection points formed in locations thereof not crossing an optical axis, wherein the first lens, the second lens, the third lens, the fourth lens, the fifth lens, the sixth lens and the seventh lens are disposed in a sequential order from the first lens to the seventh lens.

15 Claims, 32 Drawing Sheets

(56) References Cited

U.S. PATENT DOCUMENTS

| | | | |
|---|---|---|---|
| 2014/0211324 A1 | 7/2014 | Ishizaka | |
| 2015/0070783 A1* | 3/2015 | Hashimoto | G02B 13/0045 |
| | | | 359/708 |
| 2015/0103414 A1* | 4/2015 | Baik | G02B 9/64 |
| | | | 359/708 |

FOREIGN PATENT DOCUMENTS

| | | |
|---|---|---|
| CN | 203595858 U | 5/2014 |
| CN | 203673137 U | 6/2014 |
| CN | 203965708 U | 11/2014 |
| JP | 2006-163075 A | 6/2006 |
| JP | 2012-137563 A | 7/2012 |
| JP | 2012-137683 A | 7/2012 |
| JP | 2014-55992 A | 3/2014 |
| KR | 10-2011-0071807 A | 6/2011 |
| TW | 201403166 A | 1/2014 |

OTHER PUBLICATIONS

Taiwanese Office Action issued on Jul. 28, 2015 in counterpart Taiwanese Application No. 103121639 (10 pages with English translation).

Korean Office Action issued on Sep. 8, 2015 in counterpart Korean Application No. 10-2014-0036968 (8 total pages; 4 pages in English; 4 Pages in Korean).

Chinese Office Action issued on Nov. 2, 2016 in corresponding Chinese Patent Application No. 201410338798.0 (18 pages with English translation).

\* cited by examiner

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.093 | 0.398 | 1.5465 | 56.1 | Asphere | L1 |
| S2 | 2.808 | 0.063 | | | Asphere | |
| S3 | 2.386 | 0.526 | 1.5465 | 56.1 | Asphere | L2 |
| S4 | -15.817 | 0.08 | | | Asphere | |
| S5 | 6.194 | 0.28 | 1.6461 | 23.3 | Asphere | L3 |
| S6 | 2.184 | 0.207 | | | Asphere | |
| S7 | 7.066 | 0.28 | 1.6461 | 23.3 | Asphere | L4 |
| S8 | 5.706 | 0.29 | | | Asphere | |
| S9 | -100.862 | 0.312 | 1.6461 | 23.3 | Asphere | L5 |
| S10 | -17.372 | 0.232 | | | Asphere | |
| S11 | -6.319 | 0.517 | 1.6461 | 23.3 | Asphere | L6 |
| S12 | -6.838 | 0.136 | | | Asphere | |
| S13 | 1.951 | 0.706 | 1.5371 | 56.7 | Asphere | L7 |
| S14 | 1.603 | 0.333 | | | Asphere | |
| S15 | infinity | 0.3 | 1.517 | 64.2 | flat | filter |
| S16 | infinity | 0.942 | | | flat | |
| S17 | infinity | - | - | - | flat | image |

FIG. 3

|    | K      | A      | B      | C      | D      | E      | F      | G      |
|----|--------|--------|--------|--------|--------|--------|--------|--------|
| S1 | 0      | -0.027 | 0.03   | -0.106 | 0.187  | -0.183 | 0.098  | -0.023 |
| S2 | 0      | -0.104 | 0.111  | -0.245 | 0.608  | -0.768 | 0.513  | -0.15  |
| S3 | 0      | -0.099 | 0.136  | -0.434 | 1.153  | -1.574 | 1.107  | -0.328 |
| S4 | 0      | -0.052 | 0.06   | -0.11  | 0.162  | -0.192 | 0.151  | -0.059 |
| S5 | 0      | -0.062 | 0.162  | -0.381 | 0.644  | -0.772 | 0.543  | -0.162 |
| S6 | -0.335 | -0.028 | 0.086  | -0.092 | 0.038  | 0      | 0      | 0      |
| S7 | 0.049  | -0.025 | 0.004  | 0.036  | -0.016 | 0      | 0      | 0      |
| S8 | 0      | -0.019 | -0.03  | 0.054  | -0.04  | 0.017  | 0      | 0      |
| S9 | 0      | -0.03  | -0.028 | 0.086  | -0.082 | 0.035  | -0.01  | 0      |
| S10| 0      | -0.001 | -0.117 | 0.11   | 0.02   | -0.061 | 0.026  | -0.004 |
| S11| 0      | 0.201  | -0.35  | 0.277  | -0.131 | 0.04   | -0.008 | 0.001  |
| S12| 0      | 0.096  | -0.107 | 0.055  | -0.016 | 0.002  | 0      | 0      |
| S13| -1     | -0.203 | 0.085  | -0.026 | 0.006  | -0.001 | 0      | 0      |
| S14| -1     | -0.196 | 0.096  | -0.043 | 0.015  | -0.004 | 0.001  | 0      |

FIG. 4

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.057 | 0.447 | 1.5465 | 56.1 | Asphere | L1 |
| S2 | 3.194 | 0.08 | | | Asphere | |
| S3 | 2.558 | 0.474 | 1.5465 | 56.1 | Asphere | L2 |
| S4 | -36.833 | 0.048 | | | Asphere | |
| S5 | -105.601 | 0.28 | 1.6461 | 23.3 | Asphere | L3 |
| S6 | 5.157 | 0.262 | | | Asphere | |
| S7 | 10.003 | 0.26 | 1.6461 | 23.3 | Asphere | L4 |
| S8 | 5.995 | 0.271 | | | Asphere | |
| S9 | 6.407 | 0.317 | 1.6461 | 23.3 | Asphere | L5 |
| S10 | 5.481 | 0.335 | | | Asphere | |
| S11 | -7.517 | 0.516 | 1.6461 | 23.3 | Asphere | L6 |
| S12 | -6.645 | 0.08 | | | Asphere | |
| S13 | 2.025 | 0.798 | 1.5371 | 55.7 | Asphere | L7 |
| S14 | 1.58 | 0.3 | | | Asphere | |
| S15 | Infinity | 0.3 | 1.517 | 64.2 | flat | filter |
| S16 | Infinity | 0.818 | | | flat | |
| S17 | Infinity | -- | -- | -- | flat | image |

FIG. 7

|    | K       | A      | B      | C      | D      | E      | F      | G      |
|----|---------|--------|--------|--------|--------|--------|--------|--------|
| S1 | -0.522  | -0.014 | 0.027  | -0.127 | 0.262  | -0.297 | 0.176  | -0.042 |
| S2 | -3.818  | -0.087 | 0.046  | -0.1   | 0.407  | -0.65  | 0.482  | -0.143 |
| S3 | -1.063  | -0.092 | 0.066  | -0.193 | 0.694  | -1.097 | 0.821  | -0.249 |
| S4 | 0       | -0.124 | 0.373  | -0.846 | 1.286  | -1.359 | 0.871  | -0.248 |
| S5 | 0       | -0.094 | 0.351  | -0.625 | 0.54   | -0.201 | 0.023  | 0      |
| S6 | 0       | -0.03  | 0.142  | -0.33  | 0.373  | -0.215 | 0.054  | 0      |
| S7 | 0       | -0.025 | 0.057  | -0.114 | 0.095  | -0.032 | 0      | 0      |
| S8 | 0       | -0.014 | 0.053  | -0.057 | 0.033  | -0.006 | 0      | 0      |
| S9 | 0       | -0.12  | 0.046  | 0.038  | -0.087 | 0.062  | -0.018 | 0      |
| S10| 0       | -0.089 | -0.048 | 0.107  | -0.1   | 0.06   | -0.02  | 0.003  |
| S11| 0       | 0.207  | -0.395 | 0.453  | -0.435 | 0.284  | -0.113 | 0.025  |
| S12| 0       | 0.056  | -0.015 | -0.037 | 0.03   | -0.01  | 0.002  | 0      |
| S13| -13.767 | -0.112 | 0.045  | -0.014 | 0.003  | -0.001 | 0      | 0      |
| S14| -6.351  | -0.075 | 0.028  | -0.009 | 0.002  | 0      | 0      | 0      |

FIG. 8

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.112 | 0.405 | 1.5465 | 56.1 | Asphere | L1 |
| S2 | 2.892 | 0.08 | | | Asphere | |
| S3 | 2.363 | 0.522 | 1.5465 | 56.1 | Asphere | L2 |
| S4 | -20.492 | 0.08 | | | Asphere | |
| S5 | 7.07 | 0.3 | 1.6461 | 23.3 | Asphere | L3 |
| S6 | 2.445 | 0.291 | | | Asphere | |
| S7 | -13.095 | 0.28 | 1.6461 | 23.3 | Asphere | L4 |
| S8 | -22.142 | 0.234 | | | Asphere | |
| S9 | -94.594 | 0.265 | 1.6461 | 23.3 | Asphere | L5 |
| S10 | -21.51 | 0.231 | | | Asphere | |
| S11 | -6.046 | 0.501 | 1.6461 | 23.3 | Asphere | L6 |
| S12 | -7.161 | 0.136 | | | Asphere | |
| S13 | 1.958 | 0.756 | 1.5371 | 55.7 | Asphere | L7 |
| S14 | 1.598 | 0.333 | | | Asphere | |
| S15 | infinity | 0.3 | 1.517 | 64.2 | flat | filter |
| S16 | infinity | 0.914 | | | flat | |
| S17 | infinity | -- | -- | -- | flat | image |

FIG. 11

|     | K      | A      | B      | C      | D      | E      | F      | G      |
|-----|--------|--------|--------|--------|--------|--------|--------|--------|
| S1  | 0      | -0.023 | 0.009  | -0.042 | 0.082  | -0.088 | 0.052  | -0.014 |
| S2  | 0      | -0.104 | 0.093  | -0.158 | 0.43   | -0.579 | 0.403  | -0.12  |
| S3  | 0      | -0.094 | 0.088  | -0.225 | 0.696  | -1.027 | 0.758  | -0.233 |
| S4  | 0      | -0.053 | 0.062  | -0.103 | 0.146  | -0.184 | 0.152  | -0.06  |
| S5  | 0      | -0.058 | 0.123  | -0.208 | 0.269  | -0.321 | 0.25   | -0.083 |
| S6  | -0.335 | -0.029 | 0.078  | -0.081 | 0.029  | 0      | 0      | 0      |
| S7  | 0.049  | -0.03  | 0.013  | 0.021  | -0.004 | 0      | 0      | 0      |
| S8  | 0      | -0.014 | -0.027 | 0.065  | -0.064 | 0.033  | 0      | 0      |
| S9  | 0      | -0.031 | -0.033 | 0.089  | -0.076 | 0.026  | -0.005 | 0      |
| S10 | 0      | 0.002  | -0.126 | 0.13   | -0.007 | -0.043 | 0.02   | -0.003 |
| S11 | 0      | 0.213  | -0.38  | 0.322  | -0.183 | 0.078  | -0.023 | 0.004  |
| S12 | 0      | 0.105  | -0.123 | 0.068  | -0.022 | 0.004  | 0      | 0      |
| S13 | -1     | -0.202 | 0.082  | -0.024 | 0.005  | -0.001 | 0      | 0      |
| S14 | -1     | -0.195 | 0.095  | -0.042 | 0.014  | -0.003 | 0.001  | 0      |

FIG. 12

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.08 | 0.388 | 1.5465 | 56.1 | Asphere | L1 |
| S2 | 2.664 | 0.061 | | | Asphere | |
| S3 | 2.325 | 0.535 | 1.5465 | 56.1 | Asphere | L2 |
| S4 | -15.303 | 0.08 | | | Asphere | |
| S5 | 6.337 | 0.28 | 1.6461 | 23.3 | Asphere | L3 |
| S6 | 2.255 | 0.228 | | | Asphere | |
| S7 | 11.6 | 0.28 | 1.6461 | 23.3 | Asphere | L4 |
| S8 | 8.454 | 0.285 | | | Asphere | |
| S9 | -69.41 | 0.28 | 1.6461 | 23.3 | Asphere | L5 |
| S10 | -37.553 | 0.179 | | | Asphere | |
| S11 | -7.857 | 0.498 | 1.6461 | 23.3 | Asphere | L6 |
| S12 | -7.217 | 0.19 | | | Asphere | |
| S13 | 1.994 | 0.754 | 1.5371 | 55.7 | Asphere | L7 |
| S14 | 1.653 | 0.3 | | | Asphere | |
| S15 | infinity | 0.3 | 1.517 | 64.2 | flat | filter |
| S16 | infinity | 0.992 | | | flat | |
| S17 | infinity | -- | -- | -- | flat | image |

FIG. 15

|  | K | A | B | C | D | E | F | G |
|---|---|---|---|---|---|---|---|---|
| S1 | 0 | -0.023 | 0.001 | -0.01 | 0.027 | -0.035 | 0.027 | -0.009 |
| S2 | 0 | -0.098 | 0.042 | 0.036 | 0.031 | -0.128 | 0.145 | -0.063 |
| S3 | 0 | -0.088 | 0.054 | -0.095 | 0.438 | -0.757 | 0.624 | -0.211 |
| S4 | 0 | -0.044 | 0.04 | 0.01 | -0.186 | 0.306 | -0.199 | 0.037 |
| S5 | 0 | -0.058 | 0.118 | -0.105 | -0.152 | 0.414 | -0.35 | 0.105 |
| S6 | 0 | -0.033 | 0.037 | 0.202 | -0.766 | 1.163 | -0.849 | 0.242 |
| S7 | 0 | -0.015 | -0.092 | 0.41 | -0.78 | 0.85 | -0.466 | 0.096 |
| S8 | 0 | -0.003 | -0.091 | 0.25 | -0.39 | 0.352 | -0.16 | 0.03 |
| S9 | 0 | -0.031 | -0.038 | 0.147 | -0.172 | 0.092 | -0.023 | 0 |
| S10 | 0 | -0.003 | -0.104 | 0.103 | 0.01 | -0.048 | 0.02 | -0.003 |
| S11 | 0 | 0.167 | -0.312 | 0.232 | -0.107 | 0.036 | -0.008 | 0.001 |
| S12 | 0 | 0.081 | -0.083 | 0.034 | -0.005 | -0.001 | 0 | 0 |
| S13 | -1 | -0.185 | 0.056 | -0.008 | 0 | 0 | 0 | 0 |
| S14 | -1 | -0.17 | 0.064 | -0.02 | 0.004 | -0.001 | 0 | 0 |

FIG. 16

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.118 | 0.399 | 1.5465 | 56.1 | Asphere | L1 |
| S2 | 2.75 | 0.088 | | | Asphere | |
| S3 | 2.24 | 0.54 | 1.5465 | 56.1 | Asphere | L2 |
| S4 | -16.406 | 0.08 | | | Asphere | |
| S5 | 6.433 | 0.28 | 1.6461 | 23.3 | Asphere | L3 |
| S6 | 2.243 | 0.353 | | | Asphere | |
| S7 | -10.677 | 0.28 | 1.6461 | 23.3 | Asphere | L4 |
| S8 | -16.2 | 0.157 | | | Asphere | |
| S9 | -94.884 | 0.28 | 1.6461 | 23.3 | Asphere | L5 |
| S10 | -36.482 | 0.169 | | | Asphere | |
| S11 | -7.295 | 0.446 | 1.6461 | 23.3 | Asphere | L6 |
| S12 | -6.739 | 0.267 | | | Asphere | |
| S13 | 2.052 | 0.756 | 1.5371 | 55.7 | Asphere | L7 |
| S14 | 1.657 | 0.3 | | | Asphere | |
| S15 | infinity | 0.3 | 1.517 | 64.2 | flat | filter |
| S16 | infinity | 0.956 | | | flat | |
| S17 | infinity | -- | -- | -- | flat | image |

FIG. 19

|     | K  | A      | B      | C      | D      | E      | F      | G      |
| --- | -- | ------ | ------ | ------ | ------ | ------ | ------ | ------ |
| S1  | 0  | -0.022 | -0.004 | 0.008  | -0.009 | 0.006  | 0.001  | -0.003 |
| S2  | 0  | -0.098 | 0.039  | 0.066  | -0.077 | 0.056  | -0.008 | -0.013 |
| S3  | 0  | -0.086 | 0.04   | -0.034 | 0.259  | -0.468 | 0.396  | -0.141 |
| S4  | 0  | -0.031 | -0.033 | 0.181  | -0.396 | 0.481  | -0.301 | 0.065  |
| S5  | 0  | -0.047 | 0.029  | 0.104  | -0.343 | 0.462  | -0.326 | 0.091  |
| S6  | 0  | -0.03  | -0.005 | 0.266  | -0.748 | 1.058  | -0.769 | 0.225  |
| S7  | 0  | -0.012 | -0.133 | 0.443  | -0.707 | 0.696  | -0.354 | 0.067  |
| S8  | 0  | 0.017  | -0.212 | 0.515  | -0.704 | 0.565  | -0.241 | 0.044  |
| S9  | 0  | -0.02  | -0.127 | 0.35   | -0.416 | 0.253  | -0.079 | 0.008  |
| S10 | 0  | 0.001  | -0.125 | 0.152  | -0.064 | -0.003 | 0.007  | -0.001 |
| S11 | 0  | 0.186  | -0.289 | 0.205  | -0.101 | 0.039  | -0.01  | 0.001  |
| S12 | 0  | 0.073  | -0.043 | -0.015 | 0.023  | -0.01  | 0.002  | 0      |
| S13 | -1 | -0.187 | 0.072  | -0.021 | 0.004  | -0.001 | 0      | 0      |
| S14 | -1 | -0.17  | 0.066  | -0.022 | 0.005  | -0.001 | 0      | 0      |

FIG. 20

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.074 | 0.387 | 1.5465 | 56.1 | Asphere | L1 |
| S2 | 2.645 | 0.08 | | | Asphere | |
| S3 | 2.313 | 0.534 | 1.5465 | 56.1 | Asphere | L2 |
| S4 | -16.566 | 0 | | | Asphere | |
| S5 | 5.87 | 0.28 | 1.6461 | 23.3 | Asphere | L3 |
| S6 | 2.234 | 0.397 | | | Asphere | |
| S7 | 13.424 | 0.28 | 1.6461 | 23.3 | Asphere | L4 |
| S8 | 9.407 | 0.261 | | | Asphere | |
| S9 | -84.505 | 0.28 | 1.6461 | 23.3 | Asphere | L5 |
| S10 | 329.256 | 0.165 | | | Asphere | |
| S11 | -9.275 | 0.512 | 1.6461 | 23.3 | Asphere | L6 |
| S12 | -7.369 | 0.191 | | | Asphere | |
| S13 | 1.975 | 0.76 | 1.5371 | 55.7 | Asphere | L7 |
| S14 | 1.671 | 0.3 | | | Asphere | |
| S15 | infinity | 0.3 | 1.517 | 64.2 | flat | filter |
| S16 | infinity | 1.004 | | | flat | |
| S17 | infinity | — | — | — | flat | image |

FIG. 23

|  | K | A | B | C | D | E | F | G |
|---|---|---|---|---|---|---|---|---|
| S1 | 0 | −0.023 | 0.002 | −0.015 | 0.035 | −0.043 | 0.03 | −0.01 |
| S2 | 0 | −0.098 | 0.052 | −0.005 | 0.122 | −0.236 | 0.21 | −0.079 |
| S3 | 0 | −0.089 | 0.066 | −0.148 | 0.556 | −0.898 | 0.711 | −0.232 |
| S4 | 0 | −0.044 | 0.042 | −0.008 | −0.132 | 0.223 | −0.136 | 0.018 |
| S5 | 0 | −0.056 | 0.121 | −0.127 | −0.078 | 0.287 | −0.244 | 0.071 |
| S6 | 0 | −0.034 | 0.044 | 0.157 | −0.634 | 0.959 | −0.691 | 0.195 |
| S7 | 0 | −0.015 | −0.088 | 0.377 | −0.699 | 0.747 | −0.397 | 0.077 |
| S8 | 0 | −0.002 | −0.082 | 0.214 | −0.324 | 0.261 | −0.119 | 0.021 |
| S9 | 0 | −0.035 | −0.042 | 0.198 | −0.276 | 0.192 | −0.074 | 0.011 |
| S10 | 0 | 0.004 | −0.135 | 0.163 | −0.044 | −0.023 | 0.014 | −0.002 |
| S11 | 0 | 0.2 | −0.343 | 0.275 | −0.145 | 0.055 | −0.013 | 0.001 |
| S12 | 0 | 0.072 | −0.065 | 0.019 | 0.001 | −0.003 | 0.001 | 0 |
| S13 | −1 | −0.192 | 0.066 | −0.013 | 0.001 | 0 | 0 | 0 |
| S14 | −1 | −0.169 | 0.063 | −0.019 | 0.004 | −0.001 | 0 | 0 |

FIG. 24

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.231 | 0.407 | 1.5465 | 56.1 | Asphere | L1 |
| S2 | 3.144 | 0.08 | | | Asphere | |
| S3 | 2.302 | 0.525 | 1.5465 | 56.1 | Asphere | L2 |
| S4 | -15.086 | 0.08 | | | Asphere | |
| S5 | 6.346 | 0.28 | 1.6461 | 23.3 | Asphere | L3 |
| S6 | 2.138 | 0.336 | | | Asphere | |
| S7 | -10.693 | 0.28 | 1.6461 | 23.3 | Asphere | L4 |
| S8 | -16.148 | 0.08 | | | Asphere | |
| S9 | 35.834 | 0.329 | 1.5465 | 56.1 | Asphere | L5 |
| S10 | -63.71 | 0.217 | | | Asphere | |
| S11 | -8.646 | 0.527 | 1.6461 | 23.3 | Asphere | L6 |
| S12 | -8.889 | 0.242 | | | Asphere | |
| S13 | 2.07 | 0.82 | 1.5371 | 55.7 | Asphere | L7 |
| S14 | 1.671 | 0.3 | | | Asphere | |
| S15 | Infinity | 0.3 | 1.517 | 64.2 | flat | filter |
| S16 | Infinity | 0.853 | | | flat | |
| S17 | Infinity | — | — | — | flat | image |

FIG. 27

|  | K | A | B | C | D | E | F | G |
|---|---|---|---|---|---|---|---|---|
| S1 | 0 | -0.021 | -0.009 | 0.016 | -0.027 | 0.03 | -0.013 | 0 |
| S2 | 0 | -0.092 | -0.001 | 0.162 | -0.227 | 0.213 | -0.102 | 0.01 |
| S3 | 0 | -0.079 | 0.001 | 0.061 | 0.085 | -0.241 | 0.235 | -0.094 |
| S4 | 0 | -0.01 | -0.133 | 0.352 | -0.493 | 0.424 | -0.194 | 0.023 |
| S5 | 0 | -0.027 | -0.099 | 0.421 | -0.747 | 0.788 | -0.486 | 0.127 |
| S6 | 0 | -0.026 | -0.08 | 0.463 | -1.057 | 1.385 | -0.975 | 0.281 |
| S7 | 0 | 0.029 | -0.388 | 1.155 | -2.062 | 2.233 | -1.266 | 0.286 |
| S8 | 0 | 0.088 | -0.656 | 1.667 | -2.348 | 1.904 | -0.813 | 0.143 |
| S9 | 0 | 0.028 | -0.505 | 1.335 | -1.682 | 1.151 | -0.415 | 0.061 |
| S10 | 0 | 0.002 | -0.239 | 0.359 | -0.246 | 0.069 | -0.017 | 0.001 |
| S11 | 0 | 0.201 | -0.33 | 0.285 | -0.18 | 0.077 | -0.018 | 0.002 |
| S12 | 0 | 0.064 | -0.049 | 0.005 | 0.005 | -0.002 | 0 | 0 |
| S13 | -1 | -0.188 | 0.071 | -0.024 | 0.007 | -0.001 | 0 | 0 |
| S14 | -1 | -0.163 | 0.062 | -0.02 | 0.005 | -0.001 | 0 | 0 |

FIG. 28

| SURFACE NO | RADIUS OF CURVATURE (mm) | THICKNESS/ DISTANCE(mm) | REFRACTIVE INDEX | ABBE NUMBER | SHAPE | REFERENCE |
|---|---|---|---|---|---|---|
| S1 | 2.23 | 0.424 | 1.5465 | 56.1 | Asphere | L1 |
| S2 | 3.426 | 0.08 | | | Asphere | |
| S3 | 2.378 | 0.518 | 1.5465 | 56.1 | Asphere | L2 |
| S4 | -15.438 | 0.08 | | | Asphere | |
| S5 | 7.441 | 0.28 | 1.6461 | 23.3 | Asphere | L3 |
| S6 | 2.138 | 0.344 | | | Asphere | |
| S7 | -9.406 | 0.285 | 1.6461 | 23.3 | Asphere | L4 |
| S8 | -8.354 | 0.08 | | | Asphere | |
| S9 | -203.78 | 0.324 | 1.5465 | 56.1 | Asphere | L5 |
| S10 | -53.698 | 0.239 | | | Asphere | |
| S11 | -8.162 | 0.472 | 1.6461 | 23.3 | Asphere | L6 |
| S12 | -9.972 | 0.256 | | | Asphere | |
| S13 | 2.064 | 0.613 | 1.5371 | 55.7 | Asphere | L7 |
| S14 | 1.688 | 0.3 | | | Asphere | |
| S15 | Infinity | 0.3 | 1.517 | 64.2 | flat | filter |
| S16 | Infinity | 0.853 | | | flat | |
| S17 | Infinity | - | - | - | flat | image |

FIG. 31

|     | K  | A      | B      | C      | D      | E      | F      | G      |
|-----|----|--------|--------|--------|--------|--------|--------|--------|
| S1  | 0  | -0.021 | -0.008 | 0.007  | -0.004 | 0.003  | 0.003  | -0.003 |
| S2  | 0  | -0.095 | 0.001  | 0.156  | -0.187 | 0.131  | -0.036 | -0.008 |
| S3  | 0  | -0.08  | -0.004 | 0.073  | 0.108  | -0.326 | 0.315  | -0.119 |
| S4  | 0  | 0.004  | -0.201 | 0.532  | -0.781 | 0.699  | -0.337 | 0.054  |
| S5  | 0  | -0.016 | -0.177 | 0.637  | -1.086 | 1.093  | -0.619 | 0.145  |
| S6  | 0  | -0.023 | -0.105 | 0.503  | -1.056 | 1.288  | -0.85  | 0.232  |
| S7  | 0  | 0.017  | -0.257 | 0.608  | -0.902 | 0.869  | -0.463 | 0.083  |
| S8  | 0  | 0.051  | -0.349 | 0.656  | -0.662 | 0.384  | -0.107 | 0.011  |
| S9  | 0  | -0.009 | -0.191 | 0.398  | -0.312 | 0.08   | 0.016  | -0.01  |
| S10 | 0  | 0.009  | -0.108 | 0.09   | 0.032  | -0.068 | 0.03   | -0.004 |
| S11 | 0  | 0.19   | -0.286 | 0.212  | -0.114 | 0.043  | -0.009 | 0.001  |
| S12 | 0  | 0.065  | -0.055 | 0.009  | 0.004  | -0.002 | 0      | 0      |
| S13 | -1 | -0.192 | 0.071  | -0.022 | 0.006  | -0.001 | 0      | 0      |
| S14 | -1 | -0.163 | 0.061  | -0.019 | 0.004  | -0.001 | 0      | 0      |

FIG. 32

LENS MODULE

CROSS-REFERENCE TO RELATED APPLICATION

This application claims the benefit of Korean Patent Application No. 10-2014-0036968 filed on Mar. 28, 2014, with the Korean Intellectual Property Office, the disclosure of which is incorporated in its entirety herein by reference.

BACKGROUND

The present disclosure relates to a lens module.

Recent portable terminals have included a camera so that video calls and photography are possible. In addition, as the functionality of cameras in portable terminals has gradually increased, cameras for portable terminals have gradually been required to have high resolution and high performance.

However, since there is a trend for portable terminals to be miniaturized and be lightened, there may be limitations in implementing cameras having high resolution and high performance.

In order to solve these problems, recently, lenses of cameras have been formed of plastic, a material lighter than glass, and lens modules have been configured using five or more lenses in order to implement high resolution.

However, it is more difficult to improve chromatic aberration and to implement a relatively bright optical system in the lenses formed of plastic as compared to lenses formed of glass.

SUMMARY

Some embodiments of the present disclosure may provide a lens module capable of improving an aberration improvement effect and implementing high resolution.

According to some embodiments of the present disclosure, a lens module may include: a first lens having positive refractive power; a second lens having positive refractive power; a third lens having negative refractive power; a fourth lens having refractive power; a fifth lens having refractive power; a sixth lens having negative refractive power; and a seventh lens having refractive power and one or more inflection points formed in locations thereof not crossing an optical axis.

The fourth lens may have negative refractive power.

The fifth lens may have positive refractive power.

The seventh lens may have negative refractive power.

An object-side surface of the first lens may be convex, and an image-side surface thereof may be concave.

Both surfaces of the second lens may be convex.

An object-side surface of the third lens may be convex, and an image-side surface thereof may be concave.

An image-side surface of the fifth lens may be convex.

An object-side surface of the sixth lens may be concave, and an image-side surface thereof may be convex.

An object-side surface of the seventh lens may be convex, and an image-side surface thereof may be concave.

The lens module as described above may satisfy the following Conditional Equation:

$$V1-V3>20 \quad \text{[Conditional Equation]}$$

where V1 is an Abbe number of the first lens, and V3 is an Abbe number of the third lens.

The lens module as described above may satisfy the following Conditional Equation:

$$V2-V3>20 \quad \text{[Conditional Equation]}$$

where V2 is an Abbe number of the second lens, and V3 is an Abbe number of the third lens.

The lens module as described above may satisfy the following Conditional Equation:

$$(V1+V2)/2-V3>20 \quad \text{[Conditional Equation]}$$

where V1 is an Abbe number of the first lens, V2 is an Abbe number of the second lens, and V3 is an Abbe number of the third lens.

The lens module as described above may satisfy the following Conditional Equation:

$$f1>f2 \quad \text{[Conditional Equation]}$$

where f1 is a focal length of the first lens, and f2 is a focal length of the second lens.

The lens module as described above may satisfy the following Conditional Equation:

$$D12>D23 \quad \text{[Conditional Equation]}$$

where D12 is a distance from an image-side surface of the first lens to an object-side surface of the second lens, and D23 is a distance from an image-side surface of the second lens to an object-side surface of the third lens.

According to some embodiments of the present disclosure, a lens module may include: a first lens having positive refractive power; a second lens having positive refractive power; a third lens having negative refractive power; a fourth lens having refractive power; a fifth lens having refractive power; a sixth lens having positive refractive power; and a seventh lens having refractive power and one or more inflection points formed in locations thereof not crossing an optical axis.

The fourth lens may have negative refractive power.

The seventh lens may have negative refractive power.

An object-side surface of the first lens may be convex, and an image-side surface thereof may be concave.

Both surfaces of the second lens may be convex.

An image-side surface of the third lens may be concave.

An object-side surface of the sixth lens may be concave, and an image-side surface thereof may be convex.

An object-side surface of the seventh lens may be convex, and an image-side surface thereof may be concave.

The lens module as described above may satisfy the following Conditional Equation:

$$V1-V3>20 \quad \text{[Conditional Equation]}$$

where V1 is an Abbe number of the first lens, and V3 is an Abbe number of the third lens.

The lens module as described above may satisfy the following Conditional Equation:

$$V2-V3>20 \quad \text{[Conditional Equation]}$$

where V2 is an Abbe number of the second lens, and V3 is an Abbe number of the third lens.

The lens module as described above may satisfy the following Conditional Equation:

$$(V1+V2)/2-V3>20 \quad \text{[Conditional Equation]}$$

where V1 is an Abbe number of the first lens, V2 is an Abbe number of the second lens, and V3 is an Abbe number of the third lens.

The lens module as described above may satisfy the following Conditional Equation:

$$f1>f2 \quad \text{[Conditional Equation]}$$

where f1 is a focal length of the first lens, and f2 is a focal length of the second lens.

The lens module as described above may satisfy the following Conditional Equation:

$$D12 > D23 \quad \text{[Conditional Equation]}$$

where D12 is a distance from an image-side surface of the first lens to an object-side surface of the second lens, and D23 is a distance from an image-side surface of the second lens to an object-side surface of the third lens.

According to some embodiments of the present disclosure, a lens module may include: a first lens having positive refractive power; a second lens having positive refractive power; a third lens having negative refractive power; a fourth lens having positive refractive power; a fifth lens having positive refractive power; a sixth lens having negative refractive power; and a seventh lens having negative refractive power and one or more inflection points formed in locations thereof not crossing an optical axis.

BRIEF DESCRIPTION OF DRAWINGS

The above and other aspects, features and other advantages of the present disclosure will be more clearly understood from the following detailed description taken in conjunction with the accompanying drawings, in which:

FIG. 3 is a table illustrating lens characteristics of the lens module shown in FIG. 1;

FIG. 4 is a table illustrating aspherical surface coefficients of the lens module shown in FIG. 1;

FIG. 7 is a table illustrating lens characteristics of the lens module shown in FIG. 5;

FIG. 8 is a table illustrating aspherical surface coefficients of the lens module shown in FIG. 5;

FIG. 11 is a table illustrating lens characteristics of the lens module shown in FIG. 9;

FIG. 12 is a table illustrating aspherical surface coefficients of the lens module shown in FIG. 9;

FIG. 15 is a table illustrating lens characteristics of the lens module shown in FIG. 13;

FIG. 16 is a table illustrating aspherical surface coefficients of the lens module shown in FIG. 13;

FIG. 19 is a table illustrating lens characteristics of the lens module shown in FIG. 17;

FIG. 20 is a table illustrating aspherical surface coefficients of the lens module shown in FIG. 17;

FIG. 23 is a table illustrating lens characteristics of the lens module shown in FIG. 21;

FIG. 24 is a table illustrating aspherical surface coefficients of the lens module shown in FIG. 21;

FIG. 27 is a table illustrating lens characteristics of the lens module shown in FIG. 25;

FIG. 28 is a table illustrating aspherical surface coefficients of the lens module shown in FIG. 25;

FIG. 31 is a table illustrating lens characteristics of the lens module shown in FIG. 29; and FIG. 32 is a table illustrating aspherical surface coefficients of the lens module shown in FIG. 29.

DETAILED DESCRIPTION

Figure 1:
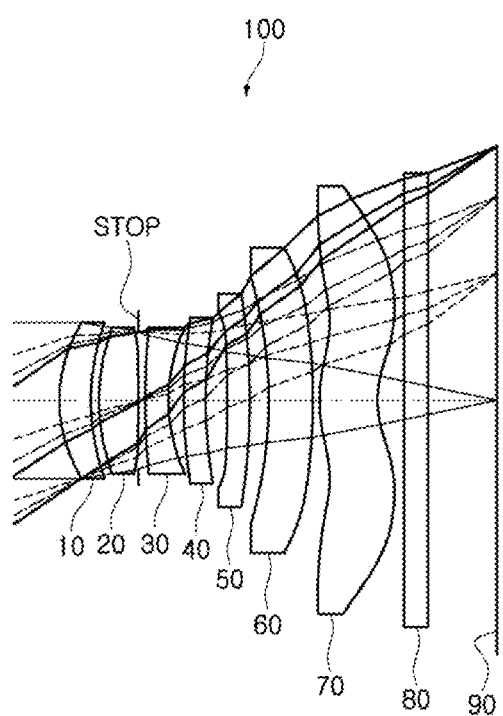
FIG. 1 is a configuration diagram of a lens module according to a first exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In addition, it is to be noted that in the present specification, a first lens refers to a lens closest to an object side and a seventh lens refers to a lens closest to an image side. Further, it is to be noted that the term 'front' refers to a direction from the lens module toward the object side, while the term 'rear' refers to a direction from the lens module toward an image sensor or the image side. In addition, it is to be noted that a first surface of each lens refers to a surface close to the object side (or an object-side surface) and a second surface of each lens refers to a surface close to the image side (or an image-side surface). Further, in the present specification, unless particularly described, units of all of lengths (f, f1, f2, f3, f4, f5, f6, f7, and f12) of the lenses radii of curvature, thicknesses, TTLs, BFLs, D12, D23, and focal may be mm. In addition, the thickness of the lens, intervals between the lenses, TTL (or OAL), SL, BFL, D12, and D23 are distances measured based on an optical axis of the lens. Further, in descriptions of lens shapes, the meaning of one surface of the lens being convex is that an optical axis portion of a corresponding surface is convex, and the meaning of one surface of the lens being concave is that an optical axis portion of a corresponding portion is concave. Therefore, although it is described that one surface of the lens is convex, an edge portion of the lens may be concave.

Likewise, although it is described that one surface of the lens is concave, an edge portion of the lens may be convex. In addition, in the following detailed description and claims, the term "inflection point" refers to a point at which a radius of curvature is changed in a portion not crossing the optical axis. In addition, in the following detailed description and claims, the term "turning point" refers to a point at which the surface is convex or concave in a portion that does not cross the optical axis.

Figure 2:
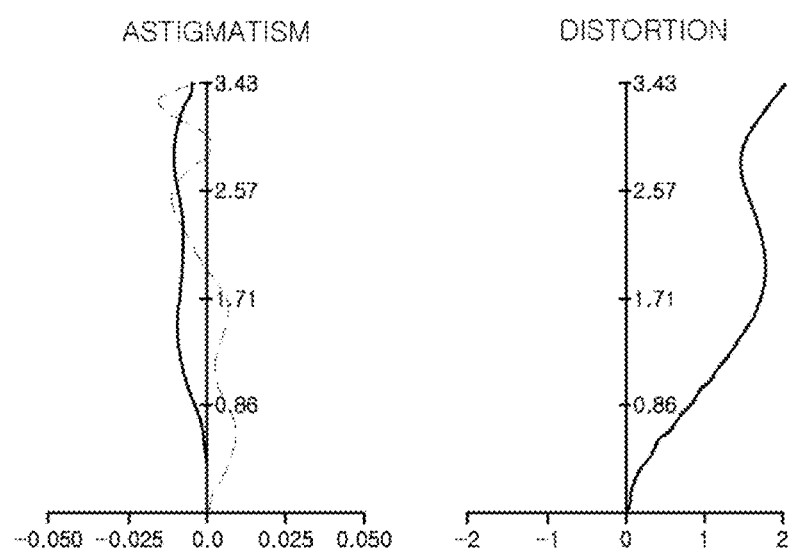
FIG. 2 is a curve illustrating optical characteristics of the lens module shown in FIG. 1.
Figure 5:
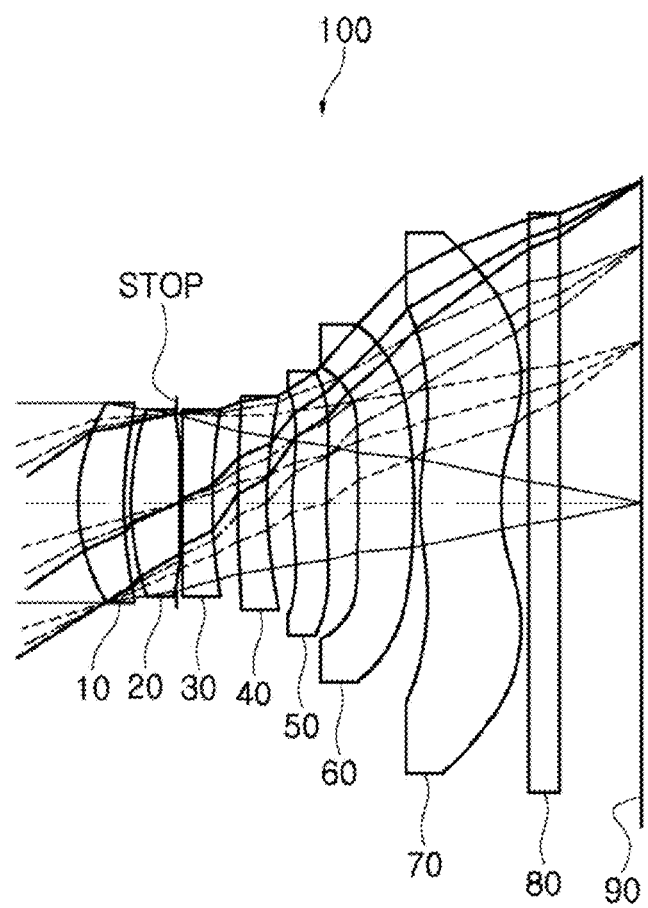
FIG. 5 is a configuration diagram of a lens module according to a second exemplary embodiment of the present disclosure.
Figure 6:
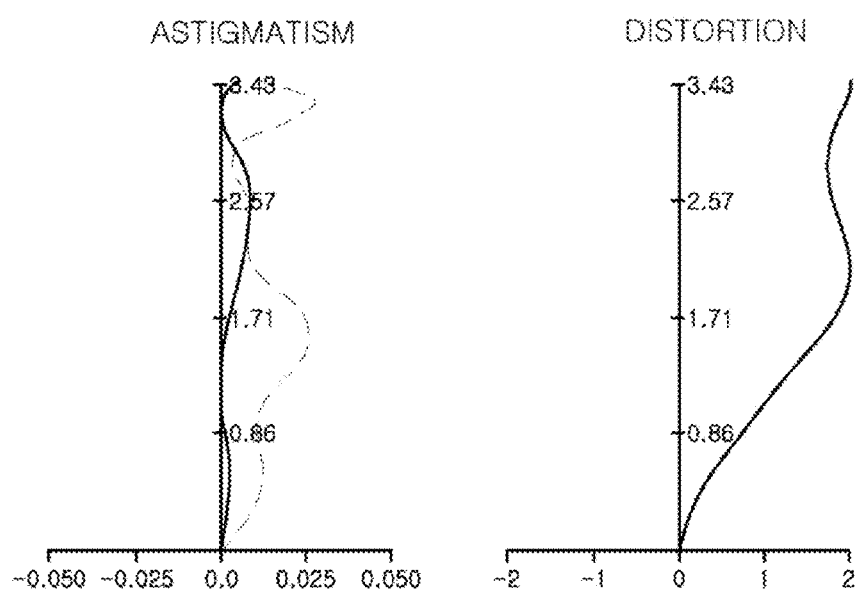
FIG. 6 is a curve illustrating optical characteristics of the lens module shown in FIG. 5.
Figure 9:
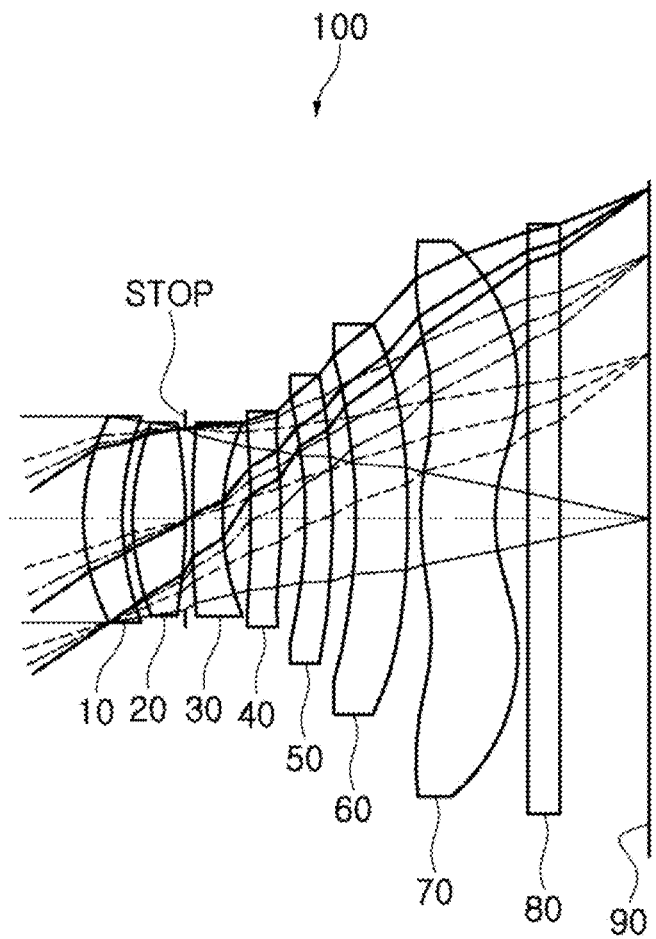
FIG. 9 is a configuration diagram of a lens module according to a third exemplary embodiment of the present disclosure.
Figure 10:
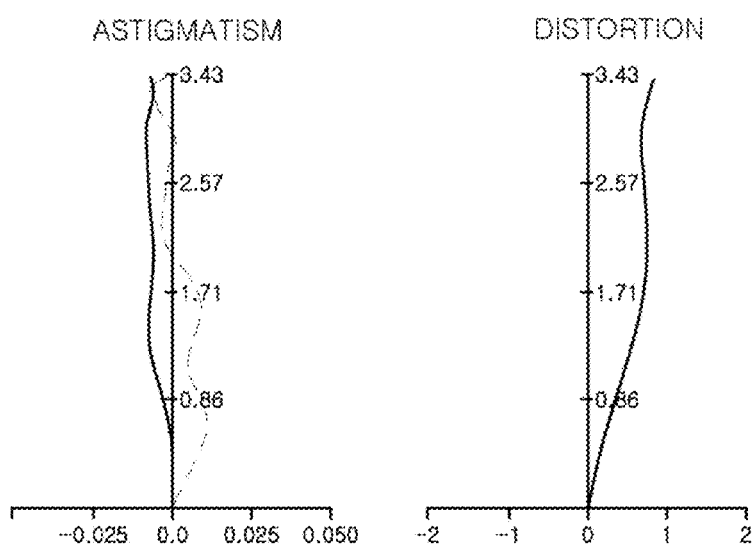
FIG. 10 is a curve illustrating optical characteristics of the lens module shown in FIG. 9.
Figure 13:
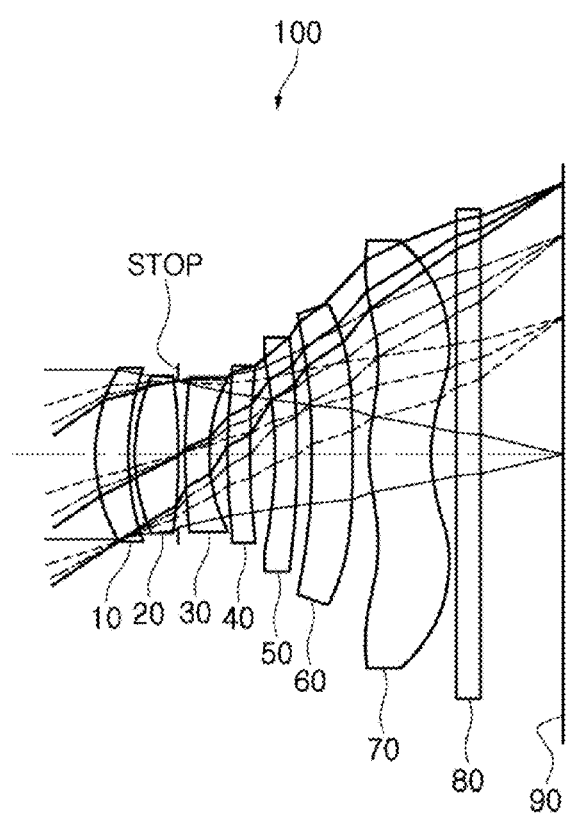
FIG. 13 is a configuration diagram of a lens module according to a fourth exemplary embodiment of the present disclosure.
Figure 14:
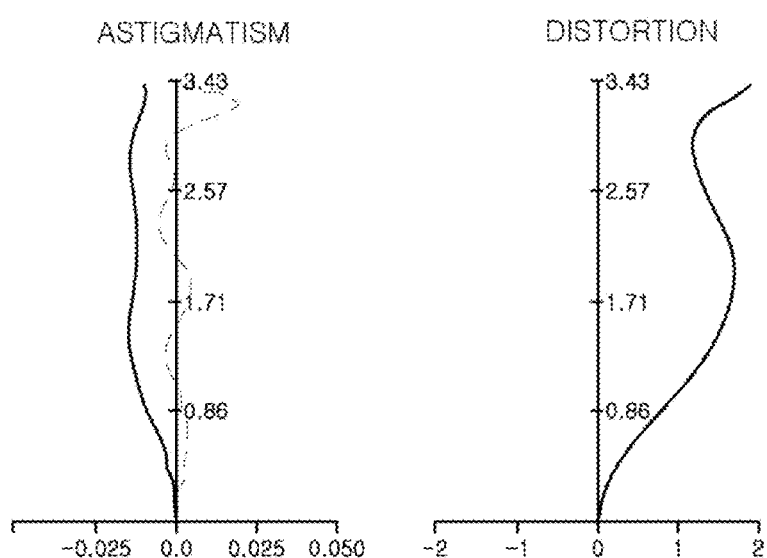
FIG. 14 is a curve illustrating optical characteristics of the lens module shown in FIG. 13.
Figure 17:
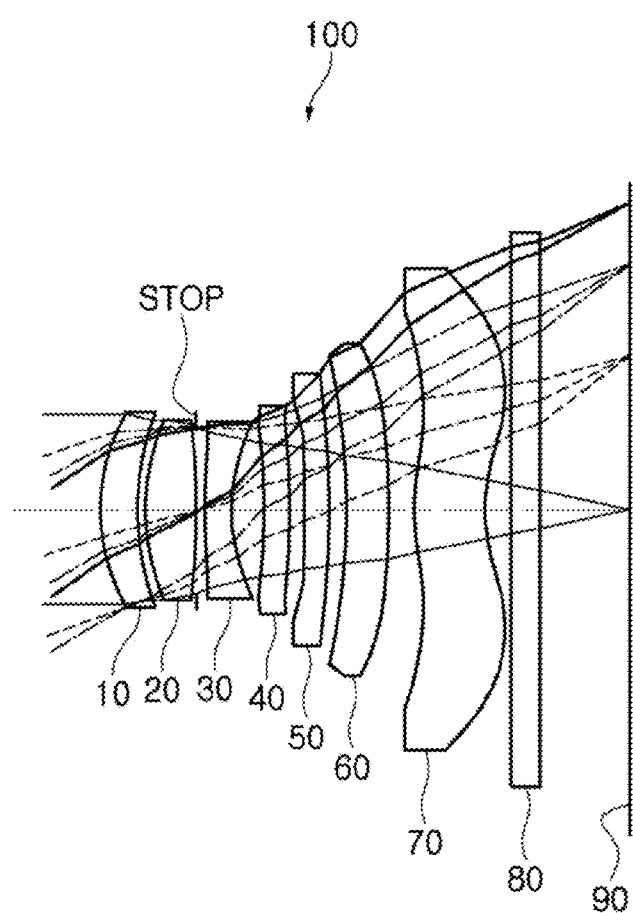
FIG. 17 is a configuration diagram of a lens module according to a fifth exemplary embodiment of the present disclosure.
Figure 18:
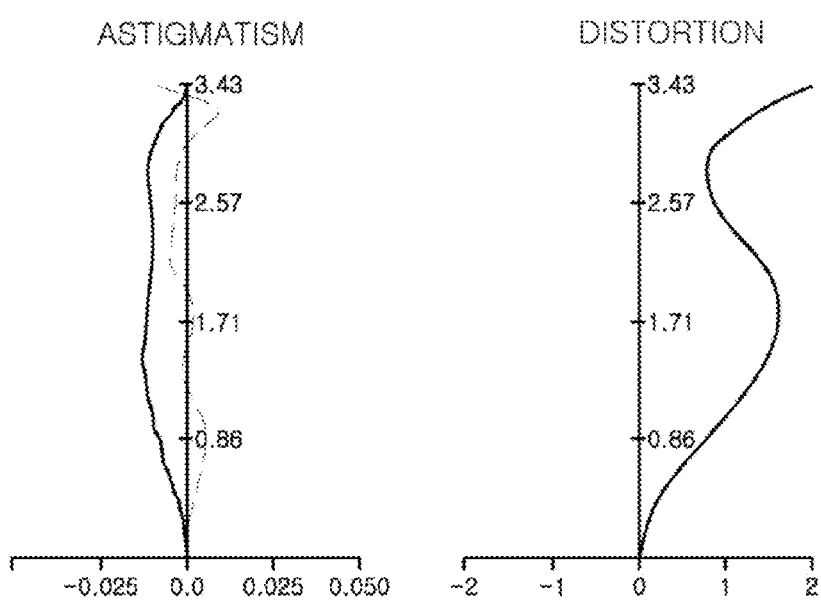
FIG. 18 is a curve illustrating optical characteristics of the lens module shown in FIG. 17.
Figure 21:
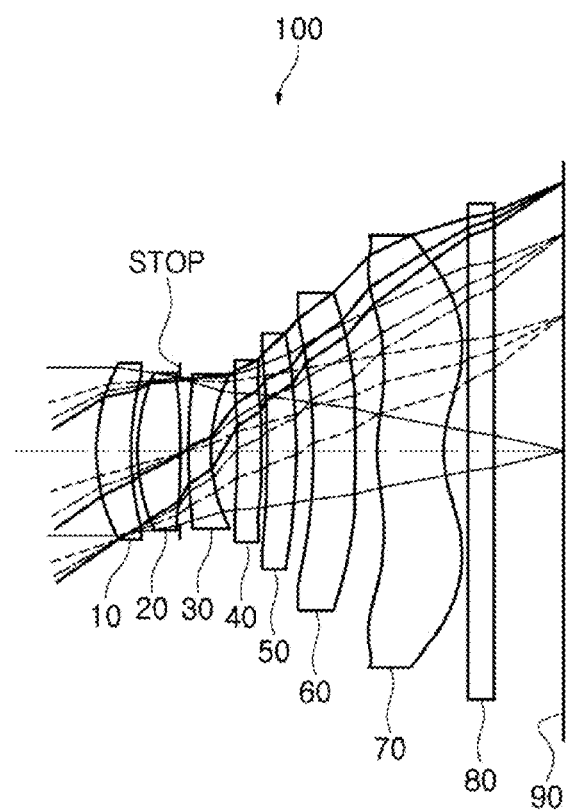
FIG. 21 is a configuration diagram of a lens module according to a sixth exemplary embodiment of the present disclosure.
Figure 22:
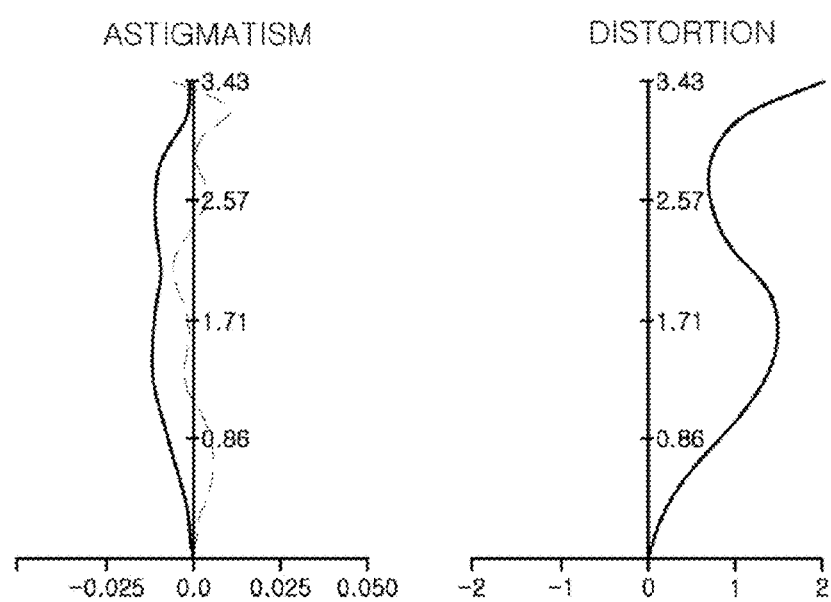
FIG. 22 is a curve illustrating optical characteristics of the lens module shown in FIG. 21.
Figure 25:
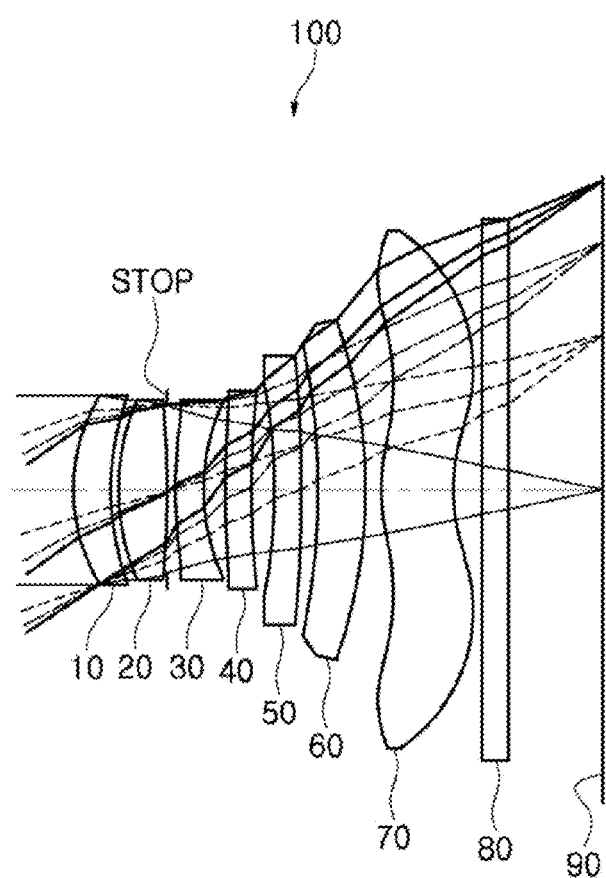
FIG. 25 is a configuration diagram of a lens module according to a seventh exemplary embodiment of the present disclosure.
Figure 26:
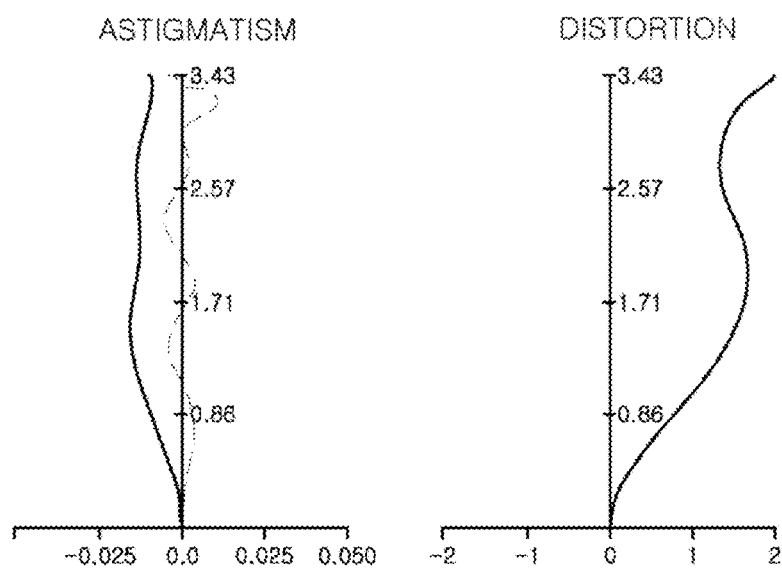
FIG. 26 is a curve illustrating optical characteristics of the lens module shown in FIG. 25.
Figure 29:
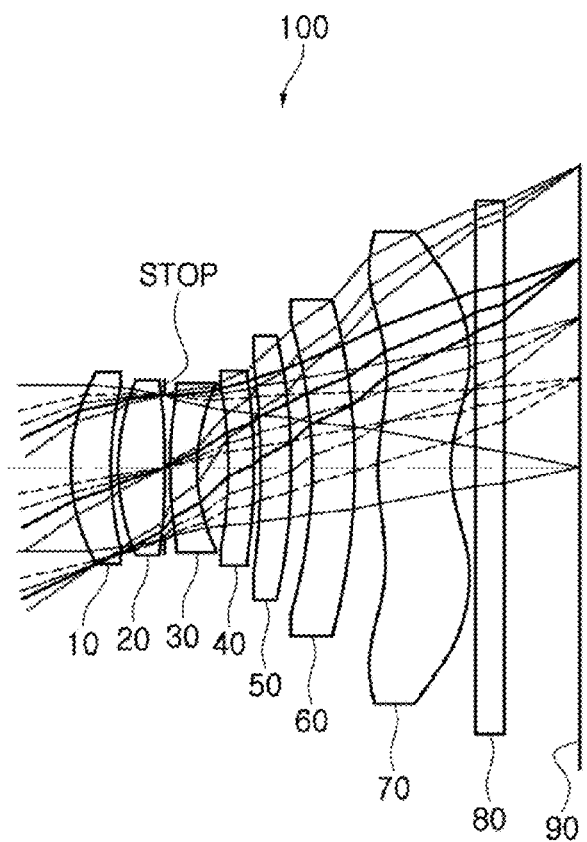
FIG. 29 is a configuration diagram of a lens module according to an eighth exemplary embodiment of the present disclosure.
Figure 30:
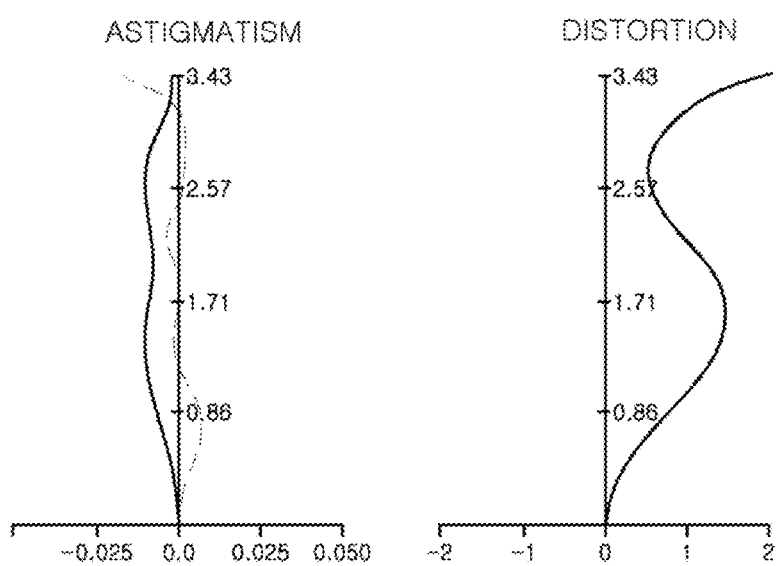
FIG. 30 is a curve illustrating optical characteristics of the lens module shown in FIG. 29.

FIG. 1 is a configuration diagram of a lens module according to a first exemplary embodiment of the present disclosure; FIG. 2 is a curve illustrating optical characteristics of the lens module shown in FIG. 1; FIG. 3 is a table illustrating lens characteristics of the lens module shown in FIG. 1; FIG. 4 is a table illustrating aspherical surface coefficients of the lens module shown in FIG. 1; FIG. 5 is a configuration diagram of a lens module according to a second exemplary embodiment of the present disclosure; FIG. 6 is a curve illustrating optical characteristics of the lens module shown in FIG. 5; FIG. 7 is a table illustrating lens characteristics of the lens module shown in FIG. 5; FIG. 8 is a table illustrating aspherical surface coefficients of the lens module shown in FIG. 5; FIG. 9 is a configuration diagram of a lens module according to a third exemplary embodiment of the present disclosure; FIG. 10 is a curve illustrating optical characteristics of the lens module shown in FIG. 9; FIG. 11 is a table illustrating lens characteristics of the lens module shown in FIG. 9; FIG. 12 is a table illustrating aspherical surface coefficients of the lens module shown in FIG. 9; FIG. 13 is a configuration diagram of a lens module according to a fourth exemplary embodiment of the present disclosure; FIG. 14 is a curve illustrating optical characteristics of the lens module shown in FIG. 13; FIG. 15 is a table illustrating lens characteristics of the lens module shown in FIG. 13; FIG. 16 is a table illustrating aspherical surface coefficients of the lens module shown in FIG. 13; FIG. 17 is a configuration diagram of a lens module according to a fifth exemplary embodiment of the present disclosure; FIG. 18 is a curve illustrating optical characteristics of the lens module shown in FIG. 17; FIG. 19 is a table illustrating lens characteristics of the lens module shown in FIG. 17; FIG. 20 is a table illustrating aspherical surface coefficients of the lens module shown in FIG. 17; FIG. 21 is a configuration diagram of a lens module according to a sixth exemplary embodiment of the present disclosure; FIG. 22 is a curve illustrating optical characteristics of the lens module shown in FIG. 21; FIG. 23 is a table illustrating lens characteristics of the lens module shown in FIG. 21; FIG. 24 is a table illustrating aspherical surface coefficients of the lens module shown in FIG. 21; FIG. 25 is a configuration diagram of a lens module according to a seventh exemplary embodiment of the present disclosure; FIG. 26 is a curve illustrating optical characteristics of the lens module shown in FIG. 25; FIG. 27 is a table illustrating lens characteristics of the lens module shown in FIG. 25; FIG. 28 is a table illustrating aspherical surface coefficients of the lens module shown in FIG. 25; FIG. 29 is a configuration diagram of a lens module according to an eighth exemplary embodiment of the present disclosure; FIG. 30 is a curve illustrating optical characteristics of the lens module shown in FIG. 29; FIG. 31 is a table illustrating lens characteristics of the lens module shown in FIG. 29; and FIG. 32 is a table illustrating aspherical surface coefficients of the lens module shown in FIG. 29.

A lens module according to the present disclosure may include an optical system including seven lenses. In detail, the lens module may include a first lens, a second lens, a third lens, a fourth lens, a fifth lens, a sixth lens, and a seventh lens. However, the lens module is not limited to only including seven lenses, but may further include other components if necessary. For example, the lens module may include a stop for controlling an amount of light. In addition, the lens module may further include an infrared cut-off filter cutting off infrared light. Further, the lens module may further include an image sensor (that is, an imaging device) converting an image of a subject incident through the optical system into an electrical signal. Further, the lens module may further include an interval maintaining member adjusting an interval between lenses.

At least one of the first to seventh lenses may be formed of plastic. For example, the first and seventh lenses are formed of plastic, and the other lenses may be formed of a different material. However, the materials of the first to third lenses are not limited thereto. For example, all of the first to seventh lenses may be formed of plastic.

At least one of an object-side surface and an image-side surface of at least one of the first to seventh lenses may be aspherical. For example, the object-side surface or the image-side surface of the first to seventh lenses may be aspherical. As another example, both of the object-side surface and the image-side surface of the first to seventh lenses may be aspherical.

The lens module according to an exemplary embodiment of the present disclosure may satisfy the following Conditional Equation.

$$V1-V3>20 \qquad \text{[Conditional Equation]}$$

Here, V1 is an Abbe number of the first lens, and V3 is an Abbe number of the third lens. The above Conditional Equation may indicate a condition for optimizing the manufacturing of the third lens. For example, since the third lens satisfying the above Conditional Equation may generally have a high refractive index, it may be easy to manufacture the third lens. In addition, since the third lens satisfying the above Conditional Equation may generally have a large radius of curvature, sensitivity to tolerance may be small.

The lens module according to an exemplary embodiment of the present disclosure may satisfy the following Conditional Equation.

$$V2-V3>20 \qquad \text{[Conditional Equation]}$$

Here, V2 is an Abbe number of the second lens, and V3 is the Abbe number of the third lens. The above Conditional Equation may indicate a condition for optimizing the manufacturing of the third lens, similarly to previous Conditional Equation. For example, since the third lens satisfying the above Conditional Equation may generally have a high refractive index, it may be easy to manufacture the third lens. In addition, since the third lens satisfying the above Conditional Equation may generally have a large radius of curvature, sensitivity to tolerance may be small.

The lens module according to an exemplary embodiment of the present disclosure may satisfy the following Conditional Equation.

$$(V1+V2)/2-V3>20 \qquad \text{[Conditional Equation]}$$

Here, V1 is the Abbe number of the first lens, V2 is the Abbe number of the second lens, and V3 is the Abbe number of the third lens. The above Conditional Equation may indicate a condition for optimizing a material of the third lens with respect to the first and second lenses. For example, the first to third lenses satisfying the above Conditional Equation may effectively correct longitudinal chromatic aberration.

The lens module according to an exemplary embodiment of the present disclosure may satisfy the following Conditional Equation.

f1>f2 [Conditional Equation]

Here, f1 is a focal length of the first lens, and f2 is a focal length of the second lens. The above Conditional Equation may indicate a condition for optimizing the manufacturing of the first lens. For example, since the first lens satisfying the above Conditional Equation may generally have a low refractive index, the first lens may be insensitive to tolerance, such that it may be easy to manufacture the first lens.

The lens module according to an exemplary embodiment of the present disclosure may satisfy the following Conditional Equation.

D12>D23 [Conditional Equation]

Here, D12 is a distance from an image-side surface of the first lens to an object-side surface of the second lens, and D23 is a distance from an image-side surface of the second lens to an object-side surface of the third lens.

The lens module according to an exemplary embodiment of the present disclosure may include one or more aspherical lenses. For example, one or more of the first to seventh lenses may be the aspherical lens. As an example, both surfaces of the first to third lenses may be aspherical. For reference, an aspherical surface of each lens may be represented by Equation 1.

$$Z = \frac{cr^2}{1+\sqrt{1-(1+k)c^2r^2}} + Ar^4 + Br^6 +$$
$$Cr^8 + Dr^{10} + Er^{12} + Fr^{14} + Gr^{16} + Hr^{18} + Jr^{20}$$
[Equation 1]

In Equation 1, c indicates curvature (1/r), k indicates a conic constant, and r indicates a radius of curvature. In addition, constants A to J sequentially indicate 4-th order to 20-th order aspherical coefficients. Further, Z indicates a sag at a specific position.

Hereinafter, the first to seventh lenses of the lens module according to an exemplary embodiment of the present disclosure will be described.

The first lens may have refractive power. For example, the first lens may have positive refractive power. The first lens may be formed of plastic. However, a material of the first lens is not limited to the plastic. For example, the first lens may be formed of another material as long as the material may transmit light. An object-side surface of the first lens may be convex, and an image-side surface thereof may be concave. For example, the first lens may have a meniscus shape in which it is convex toward an object side or a plano-convex shape in which one surface thereof is convex. At least one of the object-side surface and the image-side surface of the first lens may be aspherical. For example, the object-side surface or the image-side surface of the first lens may be aspherical. In addition, both surfaces of the first lens may be aspherical.

The second lens may have refractive power. For example, the second lens may have positive refractive power. The second lens may be formed of plastic. However, a material of the second lens is not limited to the plastic. For example, the second lens may be formed of another material as long as the material may transmit light. Both surfaces of the second lens may be convex. At least one of an object-side surface and an image-side surface of the second lens may be aspherical. For example, the object-side surface or the image-side surface of the second lens may be aspherical. In addition, both surfaces of the second lens may be aspherical.

The third lens may have refractive power. For example, the third lens may have negative refractive power. The third lens may be formed of plastic. However, a material of the third lens is not limited to the plastic. For example, the third lens may be formed of another material as long as the material may transmit light. Meanwhile, the third lens may be formed of a material having a high refractive index. For example, the third lens may be formed of a material having a refractive index of 1.6 or more and an Abbe number of 30 or less. The third lens satisfying the condition as described above may be easily manufactured and be insensitive to tolerance. An object-side surface of the third lens may be convex, and an image-side surface thereof may be concave. However, a shape of the third lens is not limited thereto. For example, the object-side surface of the third lens may be concave and the image-side surface thereof may be concave. At least one of the object-side surface and the image-side surface of the third lens may be aspherical. For example, the object-side surface or the image-side surface of the third lens may be aspherical. In addition, both surfaces of the third lens may be aspherical.

The fourth lens may have refractive power. For example, the fourth lens may have positive or negative refractive power. The fourth lens may be formed of plastic. However, a material of the fourth lens is not limited to the plastic. For example, the fourth lens may be formed of another material as long as the material may transmit light. Meanwhile, the fourth lens may be formed of a material having a high refractive index. For example, the fourth lens may be formed of a material having a refractive index of 1.6 or more and an Abbe number of 30 or less. The fourth lens satisfying the condition as described above may be easily manufactured and be insensitive to tolerance. An object-side surface of the fourth lens may be convex, and an image-side surface thereof may be concave. However, a shape of the fourth lens is not limited thereto. For example, the object-side surface of the fourth lens may be concave and the image-side surface thereof may be convex. At least one of the object-side surface and the image-side surface of the fourth lens may be aspherical. For example, the object-side surface or the image-side surface of the fourth lens may be aspherical. In addition, both surfaces of the fourth lens may be aspherical.

The fifth lens may have refractive power. For example, the fifth lens may have positive or negative refractive power. The fifth lens may be formed of plastic. However, a material of the fifth lens is not limited to the plastic. For example, the fifth lens may be formed of another material as long as the material may transmit light. Meanwhile, the fifth lens may be formed of a material having a high refractive index. For example, the fifth lens may be formed of a material having a refractive index of 1.6 or more and an Abbe number of 30 or less. The fifth lens satisfying the condition as described above may be easily manufactured and be insensitive to tolerance. However, the material of the fifth lens is not limited thereto. For example, the fifth lens may have a refractive index of 1.6or less and an Abbe number of 50 or more if necessary. An object-side surface of the fifth lens may be concave, and an image-side surface thereof may be convex. For example, the fifth lens may have a meniscus shape in which it is convex toward an image side. However, a shape of the fifth lens is not limited thereto. For example, the fifth lens may have a shape in which both surfaces thereof are convex or concave or a shape in which the object-side surface thereof is convex and the image-side surface thereof is concave. At least one of the object-side surface and the image-side surface of the fifth lens may be aspherical. For example, the object-side surface or the image-side surface of the fifth lens may be aspherical. In addition, both surfaces of the fifth lens may be aspherical.

The sixth lens may have refractive power. For example, the sixth lens may have positive or negative refractive power. The sixth lens may be formed of plastic. However, a material of the sixth lens is not limited to the plastic. For example, the sixth lens may be formed of another material as long as the material may transmit light. Meanwhile, the sixth lens may be formed of a material having a high refractive index. For example, the sixth lens may be formed of a material having a refractive index of 1.6 or more and an Abbe number of 30 or less. The sixth lens satisfying the condition as described above may be easily manufactured and be insensitive to tolerance. An object-side surface of the sixth lens may be concave, and an image-side surface thereof may be convex. For example, the sixth lens may have a meniscus shape in which it is convex toward the image side. At least one of the object-side surface and the image-side surface of the sixth lens may be aspherical. For example, the object-side surface or the image-side surface of the sixth lens may be aspherical. In addition, both surfaces of the sixth lens may be aspherical.

The seventh lens may have refractive power. For example, the seventh lens may have negative refractive power. The seventh lens may be formed of plastic. However, a material of the seventh lens is not limited to the plastic. For example, the seventh lens may be formed of another material as long as the material may transmit light. An object-side surface of the seventh lens may be convex, and an image-side surface thereof may be concave. In addition, the seventh lens may have a shape in which an inflection point is formed on at least one of the object-side surface and the image-side surface thereof. For example, the image-side surface of the seventh lens may be concave at the center of an optical axis and become convex toward an edge thereof. At least one of the object-side surface and the image-side surface of the seventh lens may be aspherical. For example, the object-side surface or the image-side surface of the seventh lens may be aspherical. In addition, both surfaces of the seventh lens may be aspherical.

The lens module configured as described above may significantly decrease aberration causing image quality deterioration and improve resolution. Further, the lens module configured as described above may be easy for lightness and be advantageous for decreasing a manufacturing cost.

Hereinafter, the lens modules according to first to eighth exemplary embodiments of the present disclosure will be described.

First, the lens module according to a first exemplary embodiment of the present disclosure will be described with reference to FIGS. 1 through 4.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 2.

FIG. 3 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 4 illustrates aspherical surface coefficients of each lens. More specifically, in FIG. 4, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be convex, and the image-side surface thereof may be concave. That is, the fourth lens 40 may have a meniscus shape in which it is convex toward an object side. The fifth lens 50 may have positive refractive power. In addition, the object-side surface of the fifth lens 50 may be concave, and the image-side surface thereof may be convex. That is, the fifth lens 50 may have a meniscus shape in which it is convex toward an image side. The sixth lens 60 may have negative refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a second exemplary embodiment of the present disclosure will be described with reference to FIGS. 5 through 8.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 6.

FIG. 7 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 8 illustrates aspherical surface coefficients of each lens. More specifically, in FIG. 8, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be concave, and the image-side surface thereof may be concave. The fourth lens 40 may have negative refractive power. In addition, the object-side surface of the fourth lens 40 may be convex, and the image-side surface thereof may be concave. That is, the fourth lens 40 may have a meniscus shape in which it is convex toward an object side. The fifth lens 50 may have negative refractive power. In addition, the object-side surface of the fifth lens 50 may be convex, and the image-side surface thereof may be concave. That is, the fifth lens 50 may have a meniscus shape in which it is convex toward the object side. The sixth lens 60 may have positive refractive power. In addition, the object-side surface of the sixth lens 60 may be concave, and the image-side surface thereof may be convex. That is, the sixth lens may have a meniscus shape in which it is convex toward an image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a third exemplary embodiment of the present disclosure will be described with reference to FIGS. 9 through 12.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 10.

FIG. 11 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 12 illustrates aspherical surface coefficients of each lens. More specifically, in FIG. 12, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be concave, and the image-side surface thereof may be convex. That is, the fourth lens 40 may have a meniscus shape in which it is convex toward an image side. The fifth lens 50 may have positive refractive power. In addition, the object-side surface of the fifth lens 50 may be concave, and the image-side surface thereof may be convex. That is, the fifth lens 50 may have a meniscus shape in which it is convex toward the image side. The sixth lens 60 may have negative refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a fourth exemplary embodiment of the present disclosure will be described with reference to FIGS. 13 through 16.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 14.

FIG. 15 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 16 illustrates aspherical surface coefficients of each lens. More specifically, in FIG. 16, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be convex, and the image-side surface thereof may be concave. That is, the fourth lens 40 may have a meniscus shape in which it is convex toward an object side. The fifth lens 50 may have positive refractive power. In addition, the object-side surface of the fifth lens 50 may be concave, and the image-side surface thereof may be convex. That is, the fifth lens 50 may have a meniscus shape in which it is convex toward an image side. The sixth lens 60 may have positive refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a fifth exemplary embodiment of the present disclosure will be described with reference to FIGS. 17 through 20.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 18.

FIG. 19 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 20 illustrates aspherical surface coefficients of each lens. More specifically, in FIG. 20, a vertical axis indicates object-side surfaces and image-side surfaces of the lenses.

For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be concave, and the image-side surface thereof may be convex. That is, the fourth lens 40 may have a meniscus shape in which it is convex toward an image side. The fifth lens 50 may have positive refractive power. In addition, the object-side surface of the fifth lens 50 may be concave, and the image-side surface thereof may be convex. That is, the fifth lens 50 may have a meniscus shape in which it is convex toward the image side. The sixth lens 60 may have positive refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a sixth exemplary embodiment of the present disclosure will be described with reference to FIGS. 21 through 24.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 22.

FIG. 23 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 24 illustrates aspherical surface coefficients of each lens. More specifically, in FIG. 24, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be convex, and the image-side surface thereof may be concave. That is, the fourth lens 40 may have a meniscus shape in which it is convex toward an object side. The fifth lens 50 may have negative refractive power. In addition, the object-side surface of the fifth lens 50 may be concave, and the image-side surface thereof may be concave. In addition, both surfaces of the fifth lens 50 may be concave. The sixth lens 60 may have positive refractive power. In addition, the object-side surface of the sixth lens 60 may be concave, and the image-side surface thereof may be convex. That is, the sixth lens may have a meniscus shape in which it is convex toward an image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to a seventh exemplary embodiment of the present disclosure will be described with reference to FIGS. 25 through 28.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 26.

FIG. 27 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 28 illustrates aspherical surface coefficients of each lens. More specifically, in FIG. 28, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have negative refractive power. In addition, the object-side surface of the fourth lens 40 may be concave, and the image-side surface thereof may be convex. That is, the fourth lens 40 may have a meniscus shape in which it is convex toward an image side. The fifth lens 50 may have positive refractive power. In addition, the object-side surface of the fifth lens 50 may be convex, and the image-side surface thereof may be convex. In addition, both surfaces of the fifth lens 50 may be convex. The sixth lens 60 may have negative refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

Hereinafter, the lens module according to an eighth exemplary embodiment of the present disclosure will be described with reference to FIGS. 29 through 32.

The lens module 100 according to the present exemplary embodiment may include a first lens 10, a second lens 20, a third lens 30, a fourth lens 40, a fifth lens 50, a sixth lens 60, and a seventh lens 70. In addition, the lens module 100 may further include an infrared cut-off filter 80 and an image sensor 90. Further, the lens module 100 may further include one or more stops. The lens module configured as described above may have aberration characteristics respectively shown in FIG. 30.

FIG. 31 illustrates radii of curvature of the lenses, thicknesses of the lenses or distances between the lenses, refractive indices of the lenses, and Abbe numbers. In detail, values on a horizontal axis corresponding to S1 in a vertical axis sequentially indicate a radius of curvature of an object-side surface of the first lens 10, a thickness of the first lens 10, a refractive index of the first lens 10, and an Abbe number of the first lens 10. In addition, values on a horizontal axis corresponding to S2 in the vertical axis sequentially indicate a radius of curvature of an image-side surface of the first lens 10 and a distance between the first and second lenses 10 and 20. Similarly, values on a horizontal axis corresponding to S3 in the vertical axis sequentially indicate a radius of curvature of an object-side surface of the second lens 20, a thickness of the second lens 20, a refractive index of the second lens 20, and an Abbe number of the second lens 20. In addition, values on a horizontal axis corresponding to S4 in the vertical axis sequentially indicate a radius of curvature of an image-side surface of the second lens 20 and a distance between the second and third lenses 20 and 30. For reference, radii of curvature of the third to seventh lenses, the thicknesses of the lenses or the distances between the lenses, the refractive indices of the lenses, and the Abbe numbers may be confirmed in the same manner as described above.

FIG. 32 illustrates aspherical surface coefficients of each lens. More specifically, in FIG. 32, a vertical axis indicates object-side surfaces and image-side surfaces of the lenses. For example, S1 in the vertical axis indicates the object-side surface of the first lens 10, and S2 in the vertical axis indicates the image-side surface of the first lens 10. In addition, S3 in the vertical axis indicates the object-side surface of the second lens 20, and S4 in the vertical axis indicates the image-side surface of the second lens 20. Similarly, numbers S5 to S14 in the vertical axis indicate object-side surfaces and image-side surfaces of the third to seventh lenses, respectively.

In the present exemplary embodiment, the first lens 10 may have positive refractive power. In addition, the object-side surface of the first lens 10 may be convex, and the image-side surface thereof may be concave. The second lens 20 may have positive refractive power. In addition, both surfaces of the second lens 20 may be convex. The third lens 30 may have negative refractive power. In addition, the object-side surface of the third lens 30 may be convex, and the image-side surface thereof may be concave. The fourth lens 40 may have positive refractive power. In addition, the object-side surface of the fourth lens 40 may be concave, and the image-side surface thereof may be convex. That is, the fourth lens 40 may have a meniscus shape in which it is convex toward an image side. The fifth lens 50 may have positive refractive power. In addition, the object-side surface of the fifth lens 50 may be concave, and the image-side surface thereof may be convex. That is, the fifth lens 50 may have a meniscus shape in which it is convex toward the image side. The sixth lens 60 may have negative refractive power. In addition, the object-side surface of the sixth lens 60 may be concave, and the image-side surface thereof may be convex. That is, the sixth lens may have a meniscus shape in which it is convex toward the image side. The seventh lens 70 may have negative refractive power. In addition, the object-side surface of the seventh lens 70 may be convex, and the image-side surface thereof may be concave. Further, the seventh lens 70 may have a shape in which an inflection point is formed on the object-side surface and the image-side surface thereof.

The lens modules according to first to eighth exemplary embodiments of the present disclosure configured as described above may satisfy all of the above-mentioned Conditional Equations as shown in Table 1.

TABLE 1

| Reference | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment |
|---|---|---|---|---|---|---|---|---|
| f1 | 12.57 | 9.41 | 12.14 | 13.99 | 13.79 | 14.11 | 12.18 | 10.46 |
| f2 | 3.83 | 4.40 | 3.91 | 3.73 | 3.64 | 3.75 | 3.69 | 3.81 |
| f3 | −5.37 | −7.60 | −5.93 | −5.57 | −5.47 | −5.76 | −5.12 | −4.74 |
| f4 | −50.02 | −23.81 | −50.21 | −49.99 | −49.46 | −50.02 | −50.00 | 104.67 |
| f5 | 32.43 | −67.64 | 43.02 | 99.98 | 99.98 | −104.05 | 45.95 | 133.32 |
| f6 | −211.59 | 71.92 | −73.47 | 104.12 | 100.26 | 50.16 | −839.37 | −78.39 |
| f7 | −64.11 | −31.72 | −56.14 | −73.21 | −45.93 | −131.23 | −45.41 | −54.59 |
| V1 − V3 > 20 | 32.80 | 32.80 | 32.80 | 32.80 | 32.80 | 32.80 | 32.80 | 32.80 |
| V2 − V3 > 20 | 32.80 | 32.80 | 32.80 | 32.80 | 32.80 | 32.80 | 32.80 | 32.80 |
| (V1 + V2)/2 · V3 > 20 | 32.80 | 32.80 | 32.80 | 32.80 | 32.80 | 32.80 | 32.80 | 32.80 |
| f1 − f2 | 8.74 | 5.01 | 8.23 | 10.26 | 10.15 | 10.35 | 8.49 | 6.65 |
| d23/d67 | 0.59 | 0.59 | 0.59 | 0.59 | 0.59 | 0.59 | 0.59 | 0.59 |
| d12 − d23 | 0.003 | 0.003 | 0.003 | 0.003 | 0.003 | 0.003 | 0.003 | 0.003 |

As set forth above, according to exemplary embodiments of the present disclosure, aberration may be easily corrected and high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
a first lens having positive refractive power;
a second lens having positive refractive power;
a third lens having negative refractive power and having a convex object-side surface;
a fourth lens having refractive power;
a fifth lens having refractive power;
a sixth lens having negative refractive power and having a convex image-side surface in a paraxial region; and
a seventh lens having refractive power and one or more inflection points formed in locations thereof not crossing an optical axis,
wherein the first lens, the second lens, the third lens, the fourth lens, the fifth lens, the sixth lens and the seventh lens are disposed in a sequential order from the first lens to the seventh lens.

2. The lens module of claim 1, wherein the fourth lens has negative refractive power.

3. The lens module of claim 1, wherein the fifth lens has positive refractive power.

4. The lens module of claim 1, wherein the seventh lens has negative refractive power.

5. The lens module of claim 1, wherein an object-side surface of the first lens is convex, and an image-side surface of the first lens is concave.

6. The lens module of claim 1, wherein both surfaces of the second lens are convex.

7. The lens module of claim 1, wherein an image-side surface of the lens module is concave.

8. The lens module of claim 1, wherein an image-side surface of the fifth lens is convex.

9. The lens module of claim 1, wherein an object-side surface of the sixth lens is concave.

10. The lens module of claim 1, wherein an object-side surface of the seventh lens is convex, and an image-side surface of the seventh lens is concave.

11. The lens module of claim 1, wherein the lens module satisfies the following relationship:

$$V1-V3>20;$$

wherein V1 is an Abbe number of the first lens, and V3 is an Abbe number of the third lens.

12. The lens module of claim 1, wherein the lens module satisfies the following relationship:

$$V2-V3>20;$$

wherein V2 is an Abbe number of the second lens, and V3 is an Abbe number of the third lens.

13. The lens module of claim 1, wherein the lens module satisfies the following relationship:

$$f1>f2;$$

wherein f1 is a focal length of the first lens, and f2 is a focal length of the second lens.

14. The lens module of claim 1, wherein the lens module satisfies the following relationship:

$$D12>D23;$$

wherein D12 is a distance from an image-side surface of the first lens to an object-side surface of the second lens, and D23 is a distance from an image-side surface of the second lens to an object-side surface of the third lens.

15. A lens module comprising:
a first lens having positive refractive power;
a second lens having positive refractive power;
a third lens having negative refractive power and having a convex object-side surface;
a fourth lens having positive refractive power;
a fifth lens having positive refractive power;
a sixth lens having negative refractive power and having a convex image-side surface in a paraxial region; and
a seventh lens having negative refractive power and one or more inflection points formed in locations thereof not crossing an optical axis,
wherein the first lens, the second lens, the third lens, the fourth lens, the fifth lens, the sixth lens and the seventh lens are disposed in a sequential order from the first lens to the seventh lens.

* * * * *